United States Patent
Nystrom et al.

[19]

[11] Patent Number: 6,162,270
[45] Date of Patent: Dec. 19, 2000

[54] DOWNDRAFT PAINT BOOTH AND FILTERS THEREFOR

[75] Inventors: Kenneth A. Nystrom, Kent; James B. Sheppard, Anderson Is., both of Wash.

[73] Assignee: N.S.Technologies Inc., Steilacoom, Wash.

[21] Appl. No.: 09/299,176

[22] Filed: Apr. 23, 1999

Related U.S. Application Data

[63] Continuation-in-part of application No. 08/872,484, Jun. 7, 1997, Pat. No. 5,976,225.
[60] Provisional application No. 60/083,708, Apr. 30, 1998.

[51] Int. Cl.[7] .............................. B01D 29/62; B01D 35/18
[52] U.S. Cl. .............................. 55/385.2; 55/481; 55/483; 55/485; 55/486; 55/487; 55/488; 55/525; 55/DIG. 46
[58] Field of Search .............................. 55/385.1, 385.2, 55/481, 483, 484, 485, 486, 487, 488, 522, 525, DIG. 46

[56] References Cited

U.S. PATENT DOCUMENTS

| | | |
|---|---|---|
| 2,583,489 | 1/1952 | Meyer . |
| 2,658,742 | 11/1953 | Suter et al. . |
| 3,170,384 | 2/1965 | Krantz et al. . |
| 3,795,093 | 3/1974 | Gerhard et al. . |
| 3,923,653 | 12/1975 | Lavins, Jr. . |
| 4,292,056 | 9/1981 | Bloomer .............................. 55/DIG. 46 |
| 4,425,870 | 1/1984 | Marshke . |
| 4,598,633 | 7/1986 | Otto et al. . |
| 4,700,615 | 10/1987 | Napadow .............................. 55/DIG. 46 |
| 4,704,952 | 11/1987 | Johnson et al. . |
| 4,729,775 | 3/1988 | Patte et al. . |
| 4,865,628 | 9/1989 | Iwanczyk .............................. 55/DIG. 46 |
| 5,040,482 | 8/1991 | McGuire et al. . |
| 5,153,034 | 10/1992 | Telchuk et al. .............................. 55/DIG. 46 |
| 5,264,014 | 11/1993 | Lannefors . |
| 5,545,239 | 8/1996 | Cordier . |
| 5,676,753 | 10/1997 | Josefson et al. . |
| 5,746,914 | 5/1998 | Hanna et al. .............................. 55/DIG. 46 |

Primary Examiner—David A. Simmons
Assistant Examiner—Minh-Chau T. Pham
Attorney, Agent, or Firm—Keith D. Gehr; R. ReamsGoodloe

[57] ABSTRACT

The invention relates to a downdraft paint booth having an overspray filtering system integral with the floor grates, and to the floor grate filters themselves. The grates have a load bearing frame portion having enclosed within it an integral or removable recyclable filter. The filter is preferably metallic and of a construction that will withstand baking in a high temperature oven to reduce captured overspray particles to an inert ash. Alternatively, the combination floor grate filters may be cleaned of paint residue by immersion in a suitable solvent or chemical bath. The floor grate filters will have 95–99% efficiency at removing airborne particulates. Secondary filters may be used after the combination floor grate filters to remove any final over-spray passing the filters. Typically, the floor grate fillers will go through five to ten cleaning cycles before he secondary filters would need replacement.

22 Claims, 7 Drawing Sheets

DOWNDRAFT PAINT BOOTH AND FILTERS THEREFOR

The present application is a continuation-in-part of application Ser. No. 08/872,484, filed Jun. 7, 1997, now U.S. Pat. No. 5,976,225. The present application further claims priority from provisional application Serial No. 60/083,708, filed Apr. 30, 1998.

The invention relates to a novel load bearing combination floor grating and filter for a downdraft paint booth and to novel paint booth structures using the grating. The grating is capable of filtering and removing paint overspray particulates from the air stream exiting the paint booth. The grating is readily replaced and may be thermally or solvent cleaned and recycled reducing or eliminating filter disposal problems.

BACKGROUND OF THE INVENTION

In various stages of assembly of large equipment and parts thereof, and particularly for trucks, automobiles, construction machinery, aircraft, or the like, it is generally necessary for workers to place a protective coating on both large and small objects. The large objects present the most difficulty, and such objects are normally coated in an environmentally secure containment structure commonly known as a paint booth. Paint booth structures have been devised and used which effectively employ various air flow design characteristics, to reduce paint booth operating costs while minimizing environmental contamination. In those prior art paint booth designs known to us which achieve both objectives while maintaining adequate paint finish quality, the paint booth operations have resulted in a large quantity of air fillers that are contaminated with paint, and which must be safely and legally handled and discarded. Coating overspray in a typical paint booth might be as much as 50% or more of the volume of coating which adheres to the object being sprayed. With increasingly stringent environmental laws, many paint contaminated filters have had to be handled as hazardous waste, and where such handling is required, a premium has been paid to dispose of the loaded filters in hazardous waste landfills. In particular, the U.S. Environmental Protection Agency, and the environmental agencies in various U.S. states and in other nations, have promulgated regulations and strict standards which require testing and rigorous documentation for land disposal of paint loaded filters which have been produced as a result of paint booth operations.

Collection of overspray paint from a spray booth is generally achieved now by (a) use of paper type filters, (b) use of fiberglass type filters, or (c) use of a water spray curtain for knockout of paint particles to a circulating water bath. Large articles, such as automobiles, are normally painted in a tunnel-type spray booth with the exhaust air and overspray being drawn through a floor grating into a water spray or wet scrubber to remove fine paint droplets. Examples of spray booths of this type are seen in U.S. Pat. Nos. 3,170,384 to Krantz et al.; 3,795,093 to Gerhard et al.; 4,425,870 to Marshke; 4,598,633 to Otto et al.; 4,704,952 to Johnson et al.; 4,759,775 to Patte et al.; 5,040,482 To McGuire et al.; 5,545,239 to Cordier; and 5,676,753 to Josfesson et al. U.S. Pat. No. 5,264,014 to Lannefors et al. shows a similar system in which the wet scrubber is followed by a wet electrostatic precipitator. Smaller articles are usually painted in a cabinet-type spray booth in which air is typically exhausted through the back wall using a bank of dry disposable filters to capture overspray. An example is seen in U.S. Pat. No. 2,583,489 to Meyer. U.S. Pat. No. 2,658,742 shows a catalytic filter for removal of combustible gaseous contaminants. U.S. Pat. No. 3,923,653 to Lavins, Jr. shows a method of removing plastic waste from an extrusion process filter by induction heating.

Both paper and fiberglass filters result in paint saturated filters which must pass a regulatory "paint filter test" that, to pass, must show the absence of free liquids, before disposal in a landfill is allowed. Typically, such filters must be disposed, at relatively high cost, in a hazardous waste landfill. Also, wet spray booth designs generally result in the creation of significant quantities of sludge, which must be periodically removed from the treatment system and disposed, often by shipment to a hazardous waste landfill.

In spite of the various schemes which have so far been offered to the marketplace to reduce airflow, limit overspray, or to enhance paint filter life, a continuing and growing demand exists for a simple and inexpensive apparatus and method which can be used to preserve and enhance the life cycle of paint filters, thus reducing overall costs. The need for improved filters and for improved methods for paint booth construction and operation is especially acute in conjunction with new fabrication or refurbishment work where large mobile objects are to be painted, such as heavy haul trucks, rail cars, construction machinery, or large commercial aircraft. As will be evident to those familiar with such paint booths and to whom this specification is particularly addressed, a novel downdraft paint booth floor construction and filter apparatus, and a method of using the filter apparatus which effectively eliminates the necessity of disposing of large quantities of spent paint filters, would be of great benefit in increasing the profitability of manufacturing plants.

SUMMARY OF THE INVENTION

We have now invented, and disclose herein, a novel combination floor grate filter for use as a load bearing floor in downdraft type paint booths. Our novel combination floor grate filter is of the type suitable for removal of paint from an air stream passing through the filter. The combination floor grate filter comprises a grate or frame portion having a grate tread surface. The grate tread surface extends between and is supported by opposing spaced apart edge portions so that it is generally U-shaped in cross section. The supporting edge portions each have attachment portions, preferably flanges, which support a filter media element.

The floor grate filters serve as easily removable load hearing elements in the floor of the paint booth. By load bearing is meant that the grate or frame portion is made of a metal or other suitable material of sufficient thickness and appropriate span to withstand an applied load of at least 630 kg/m$^2$ (150 lb/ft$^2$). The floor grate filters rest on supporting members, such as flanges, which form part of the structural members of the spray booth. They are normally installed in a side-by-side and end-to-end relationship so that they may be of a size easily handled during removal and replacement.

The filter media element can be provided either as an integral part of the tread design or as a convenient replaceable permanent filter media. For most applications, we prefer to utilize a fully recyclable filter media material. In one embodiment a mesh media section is provided for insertion into the attachment portions of the supporting edge portions of combination floor grate filter. In another embodiment, the filter media portion is comprised of at least a partial (if not full) peripheral frame section and a mesh media section. Preferably, the mesh media section includes a plurality of mesh portions. Such mesh portions are ideally arranged in a series $M_1$, $M_2$, $M_3$ through $M_n$, that are sized with less open area in each successive mesh portion so that the overall mesh media section has a progressive increasing density characteristic. More particularly, a preselected portion of the particulate material entrained in the air entering the first mesh portion $M_1$ can be removed by mesh portion $M_1$, providing a removal efficiency $E_1$, and a preselected portion of the material entrained in the air entering the second mesh portion $M_2$ can be removed, providing a removal efficiency $E_2$. By controlling the open area of first mesh portion $M_1$, and the open area of second mesh portion $M_2$ (and with similar geometry in subsequent mesh portions) the capture of particulates can be spread rather evenly along each of the mesh portions $M_1$ through $M_n$. In this manner, an excessive amount of material is not captured at the first mesh portion $M_1$ so as to result in "face blinding" of the filter, that is, a condition where the filter would be effectively plugged by material loading which occurs at the first mesh portion $M_1$ (or perhaps by loading which occurs at the first mesh portion $M_1$ in combination with closely following subsequent mesh portions in the direction of air flow). In the progressive density filter construction technique described, the second mesh portion $M_2$ and subsequent mesh portions through mesh portion $M_n$ are constructed so that material escaping prior mesh portions is removed by mesh portion $M_n$ to an efficiency $E_n$, where the through airstream contamination level is lowered to some additional degree at each successive mesh portion in the mesh media section of the filter.

Further, we have developed methods for removing paint which has been deposited on combination floor grate filters, and for returning such floor grate filters to duty for further paint removal in the paint booth. One useful method starts by providing a combination floor grate filter in an operating position in a paint booth, where the combination floor grate filter is of the type comprising a grate portion and a filter portion. The filter portion further comprises a frame section and a mesh section. The mesh section may have a plurality of mesh portions $M_1$ through $M_n$. In a preferred embodiment, the frame section and the mesh section are each comprised of a material capable of repeatedly withstanding heating to and cooling from temperatures high enough to a oxidize a paint material deposited thereon. When the filter has completed its operating cycle, typically as determined by a reduced linear velocity which is achievable through the filter media that indicates that a desirable upper limit for paint loading on the filter has been reached, then the grate portion and the filter portion are placed into an oxidizing type oven. The oxidizing type oven is selected to be suitable for heating the grate portion and the filter portion to a temperature sufficient to oxidize the paint material deposited thereon. The grate portion and the filter portion are heated to oxidize the paint residue, to produce a residual ash therefrom. The grate portion and the filter portion are removed from the oven, and cooled. Before, during, or after the cooling step, the ash residual is removed from both the grate portion and the filter portion, via any convenient mechanical, pneumatic, or hydraulic agitation. Then, the combination grate filter is returned to an operating position in the paint booth floor.

Thus, it is clear that in one embodiment, all components of the combination grate filter are each capable of reliably withstanding heating to and cooling from a temperature sufficiently high to oxidize a coating or paint which has been collected on the surfaces of the grate portion and the filter portion, including on the frame section and the mesh section of the filter portion. Also, the frame section and the mesh section are capable of reliably withstanding accumulation of residual ash, and mechanical cleaning of such ash therefrom, as may be produced when the paint which has been collected is oxidized at high temperature.

Alternatively, the loaded floor grate filters may be of a material of construction that may be cleaned in a solvent or chemical bath. The cleaning vat contains adequate mechanical agitation, hydraulic, or ultrasonic cleaning devices sufficient to substantially remove the paint material deposited on the combination floor grate filter. Then, the integral combination floor grate filter (or alternatively the grate portion and the filter portion) are removed from the cleaning vat. Preferably, all traces of solvent are substantially removed. Then, the combination floor grate filter is returned to an operating position in the paint booth floor.

Importantly, our media filters are structurally resistant to repeated cleaning cycles, whether by high temperature heating or by chemical cleaning, and are simple, relatively inexpensive, and easy to install, remove, and reinstall during repeated use. Very simply, our novel combination floor grate filters, whether using replaceable media, permanent metal or non-metal media, are quite superior to other filtration techniques which have been employed heretofore by others for construction and operation of paint booths.

In addition, our recycling method for our novel heat treatable paint filters differs from prior art practices known to us in that we have developed a filter capable of reliably filtering paint matter from an airstream, whether liquid or solid, while being capable of reliably and repeatedly withstanding heating to relatively high temperature in an oven, where the coating residue is oxidized and the solid residual reduced to ash. After combustion and cooling the residual ash is removed and the filters are returned to service. The user can return the filters to service in the paint booth again and again, after each cycle of heating, oxidizing the paint in the loaded filter, and then cooling and removing the residual ash therefrom. If and as desired, when our combination floor grate filters are used, high temperature resistant floor grate portions can be utilized, and in such cases, the floor grate can also be cleaned via the "burn-off" process just described, and returned to service.

When our combination floor grate filters are utilized in paint booths, the overall filtration efficiency can be enhanced by using a secondary or subsequent or "post filter". Post filters may be of either the flat type or of the pocket type, as suitable for a particular application. Generally, we prefer to utilize a post filter of the high efficiency polymer fiber type.

In a further embodiment, the process of thermally cleaning and recycling the combination floor grate filters can be automated, with the filters located on a conveying system to move the combination floor grate filters (a) from the paint booth, (b) to an oven, (c) through an ash removal system, and (d) thence back to the paint booth for further use in paint removal.

In yet a further, similar embodiment, the process of chemically cleaning and recycling the combination floor grate filters can be automated, with the filters located on a conveying system to move the combination floor grate filters (a) from the paint booth, (b) to a cleaning apparatus, (c) from the cleaning apparatus (d) removing residual chemicals, and (e) thence back to the paint booth for further use in paint overspray removal.

From the foregoing, it will be apparent to the reader that one important and primary object of the present invention resides in the provision of a novel combination floor grate filter for removal of paint overspray from an airstream leaving a downdraft paint booth.

Closely related to the preceding object, another important object is in the provision of improved methods for cleaning both paint booth grates and filters.

Still another important object of one embodiment of the invention is to minimize or eliminate "one-time use" filters in downdraft paint booth applications to reduce need for disposal in landfills, particularly hazardous waste landfills.

Another important object is to clean filters simultaneously with the cleaning of floor grates in down draft type paint booths, thus accomplishing cleaning of filters without appreciable additional work over that already required for cleaning of floor grates and eliminating the need to separately clean or replace filters.

Yet another object is to reduce operational costs by reducing the need to procure replacement filters on an on-going basis, i.e., to eliminate "one time use" paint booth filters.

Another important object is to reduce operational costs in wet type paint booths by reducing the water treatment chemical costs as a result of better particulate removal efficiency before wet scrubbing is conducted in such booths.

A related and important object is to minimize generation of sludge in wet-type paint booths, to reduce sludge disposal costs.

Other important but more specific objects of the invention reside in the provision of novel combination floor grates filters which are highly efficient at removing paint and coating materials and avoid premature face loading by utilizing a progressive density mesh design that provides a gradual, distributed loading of the mesh portions in the filter. In a preferred embodiment, the filters can withstand repeated heating and cooling for oxidative removal of paint or coating which has been deposited on the grate portion and on the filter portion. They are amenable to immersion in chemical cleaning solutions which effectively remove paints or coating which has been deposited on the grate portion and on the filter portion of the combination. Further, they can directly replace existing floor grates; are easy to install; are easy to remove for cleaning; and are easily cleaned.

Other important objects, features, and additional advantages of our invention will become apparent to the reader in the detailed description taken in conjunction with the accompanying drawings.

DETAILED DESCRIPTION OF THE PREFERRED EMBODIMENTS

Figure 1:
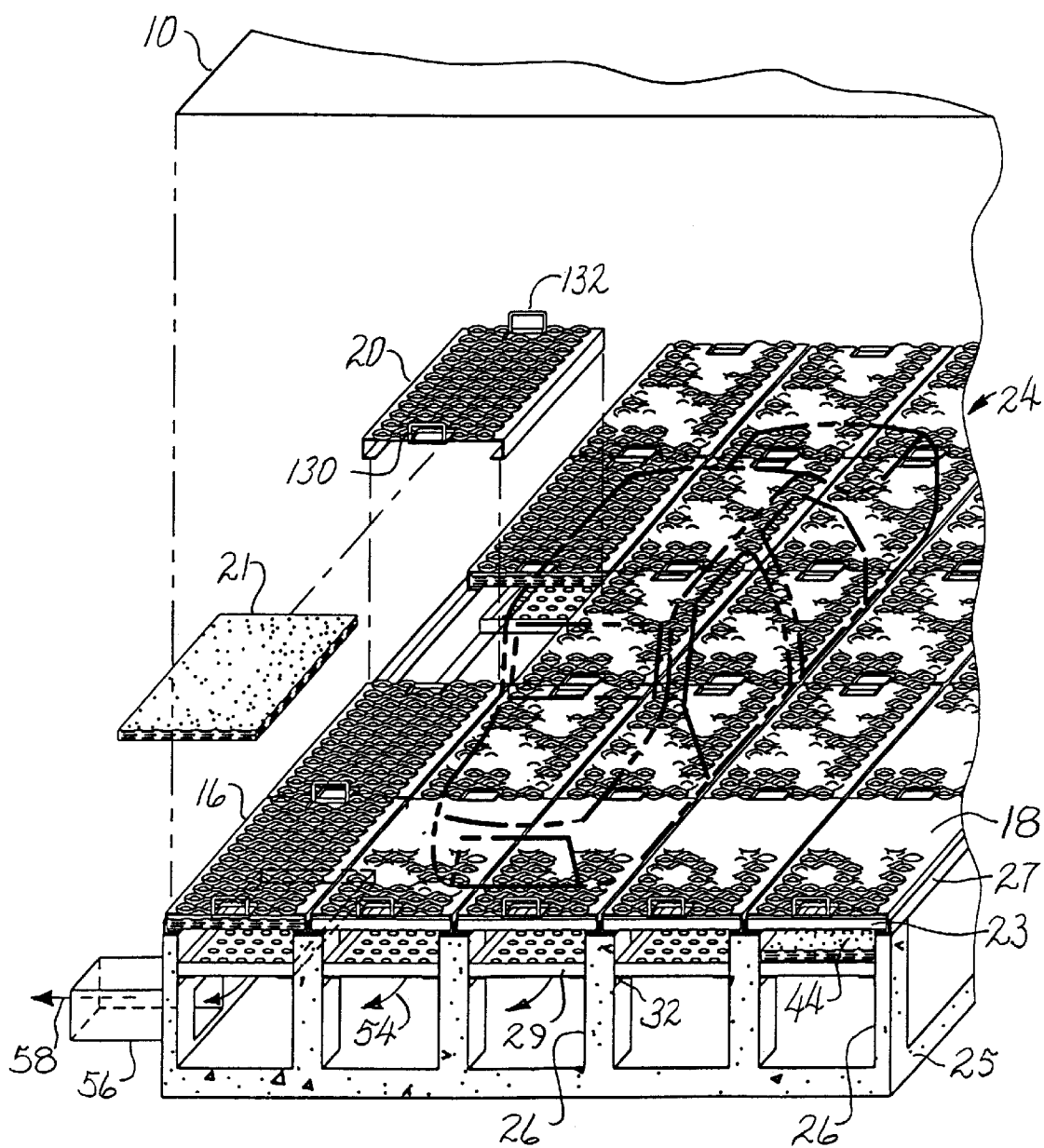
FIG. 1 is a perspective view of a portion of a downdraft type paint booth, showing the use of one embodiment of the combination floor grates filters, and showing in phantom lines an automobile to be painted in the paint booth.
Figure 2:
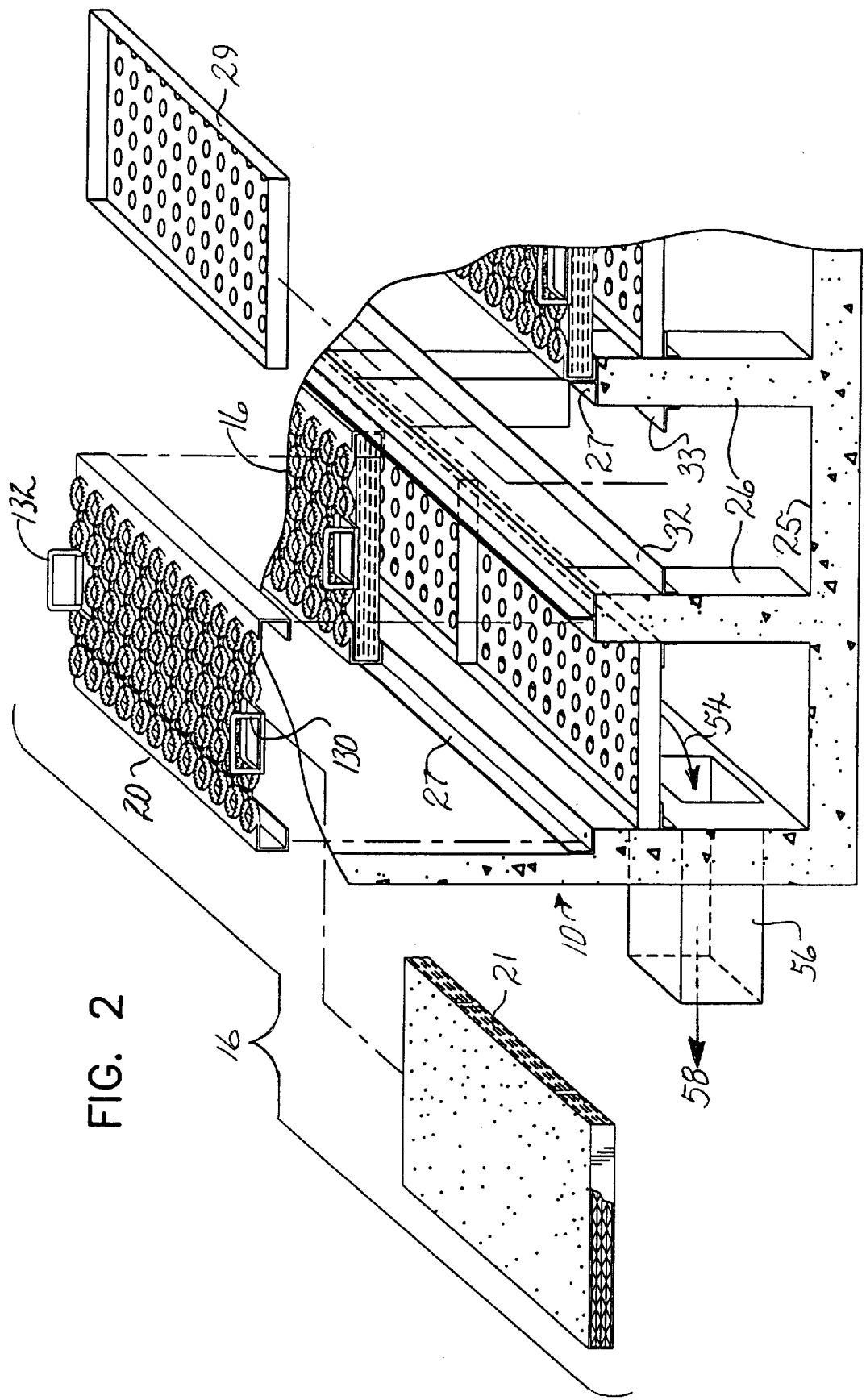
FIG. 2 is a perspective view of a portion of a dry type downdraft paint booth, similar to that shown in FIG. 1 above, showing additional detail of one embodiment of the metal filter media.

Referring now to the drawings, FIG. 1 and FIG. 2 depict a dry, downdraft type paint booth 10 utilizing a first embodiment 16 of our combination floor grate filters. Each has (a) an outer frame section 20, generally U-shaped or channel shaped in cross section, with an integral floor grate, and (b) a filter element 21 having mesh media therein. Although the first embodiment of the combination floor grate filters 16 do not have end caps to contain the filter element 21, in a second and preferred embodiment 18 of our combination floor grate filters, first and second end caps 23, are permanently attached (such as by spot welding) and are configured to retain a suitably sized filter element 21 within outer frame section 20 to assist in prevention of air bypass around the filter element. Thus, our novel combination floor grate filters 16 or 18, as illustrated, are utilized as the deck 24 of the down-draft type paint booth 10, and include in combination the floor grating as well as the primary filter element. The filters 16 or 18 may be readily handled for removal or replacement by foldable handles 130, 132.

Figure 5:
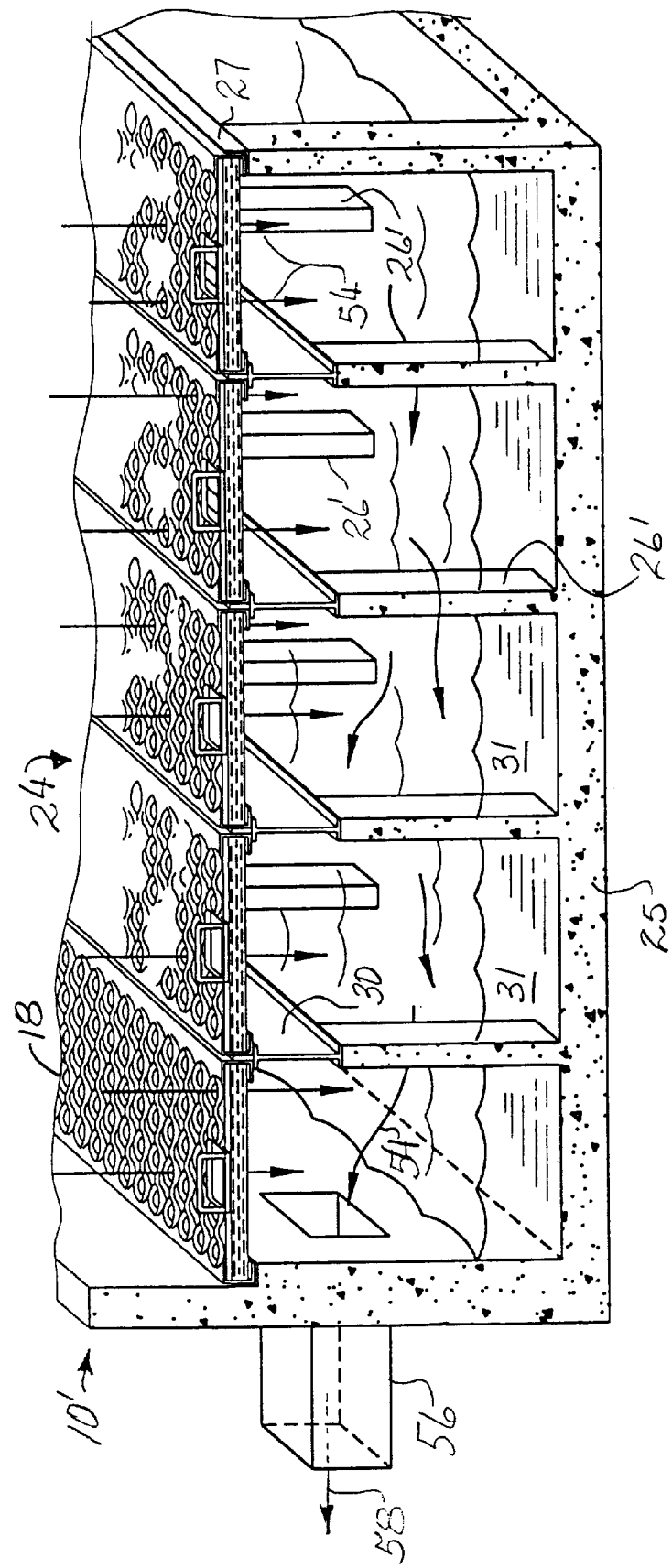
FIG. 5 shows in cross section a wet scrubber type downdraft paint booth using the combination floor grate filter.

Our novel combination floor grate filters are mounted in conventional fashion in a down draft dry type paint booth 10 (see FIG. 1), or in a wet scrubber type downdraft paint booth 10' (see FIG. 5). As shown in FIG. 1, the most common design is one in which a base or foundation 25, supports spaced apart columns 26, which in turn support opposing L-shaped longitudinally running mounting flanges 27 and 32, 33. As indicated in FIG. 5, the mounting flanges may be supported by I-beams 30 (or other supporting structure) to provide adequate support strength.

Figure 3:
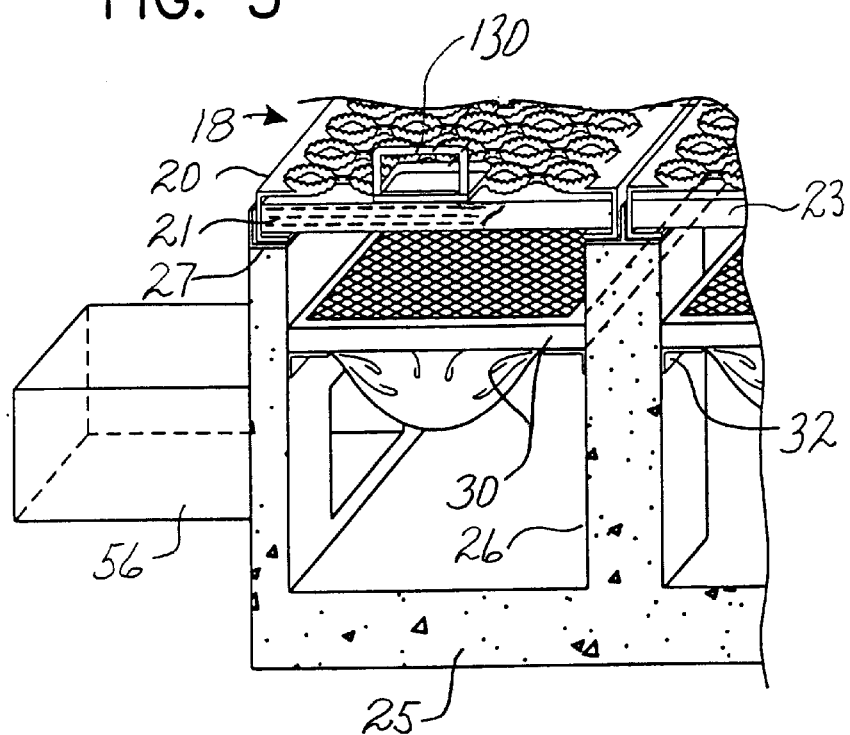
FIGS. 3 and 4 are cutaway perspective views depicting the use of integral pocket type secondary or post filters.
Figure 4:
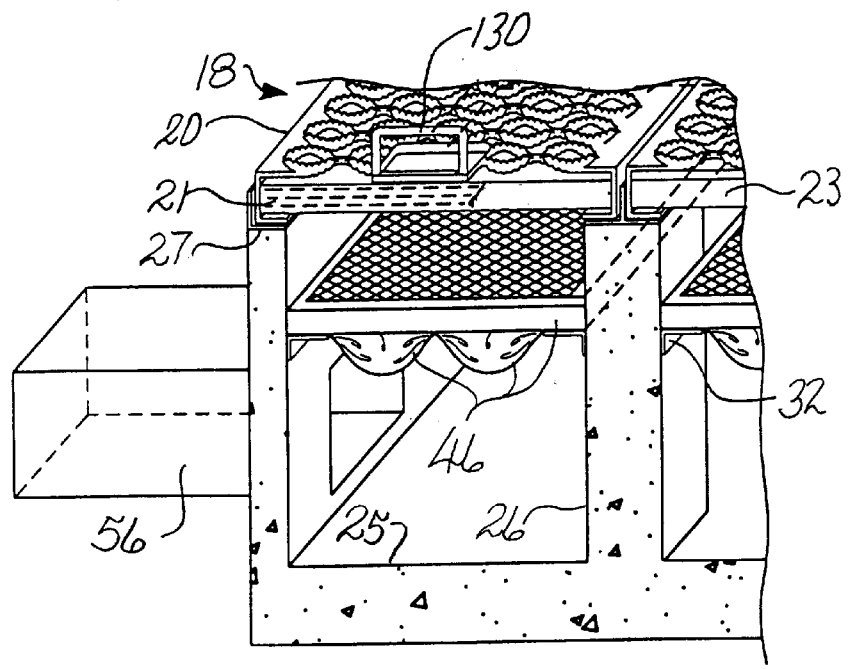

In the case of a dry paint booth 10, as shown in FIGS. 1 and 2, secondary filter racks 29, supported on flanges 32, 33, are provided to receive optional post filter media 44, one of which is indicated on FIG. 1. Alternately, structurally self supporting single or pleated pocket type post filters 30 or 46 (as shown in FIGS. 3 and 4, respectively) may be suspended from inwardly directed generally L-shaped support flanges 32 and 33, or other suitable support structure. Typically, the post filters 30, 44, or 46 are provided in a fibrous synthetic polymer construction which is not amenable to recycling. However, recyclable post filters can be used where required filtration efficiency is obtainable with such filters. More specifically, as shown in FIGS. 1 and 2, an air stream 54 exits downward from the paint booth 10 passing through the combination filter grating 16 or 18. The entering air stream contains droplets or particles of paint overspray and is directed through the combination floor grate filters 16 or 18, and then through the optional post filters 30, 44, or 46. As a result of this filtering process, it is customary that in excess of 95% of the mass of the overspray particles are removed from the air stream by the primary filters. More typically in excess of 99% of the mass of overspray particles are removed from the air stream prior entering to the secondary filters. Clean air 54 is subsequently directed outward through exhaust plenum 56 in the direction of reference arrow 58.

As Seen in FIG. 5, a wet type downdraft paint booth 10' may be used in conjunction with the floor grate filters of the present invention. In this case the water curtain acts as a secondary filter to the primary filters 18 forming the deck 24 of the spray booth. This is in contrast to the usual wet downdraft spray booth in which the water acts as a primary filter to trap overspray particles. In the simplified diagram shown in FIG. 5, the floor grate filters 18 are supported on I-beams 30 atop pillars 26'. Auxiliary flanges 27 on the upper flange of the I-beams position the filters and retain them until taken up for cleaning and replacement. A water spray or curtain, not shown, entrains any overspray particles not removed by filters 18 and traps them in pool 31. Cleaned air stream 58 passes out through plenum 56.

Figure 6:
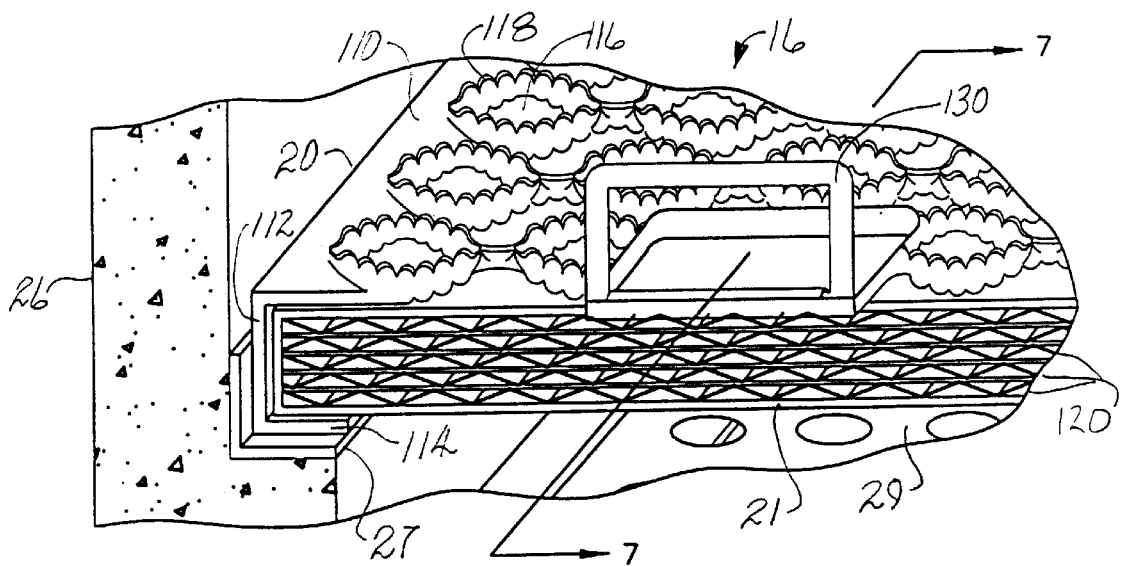
FIG. 6 provides a partially cut away perspective view of one embodiment of a heat resistant metal filter, shown with end cap in place to secure the progressive density filter layers.
Figure 7:
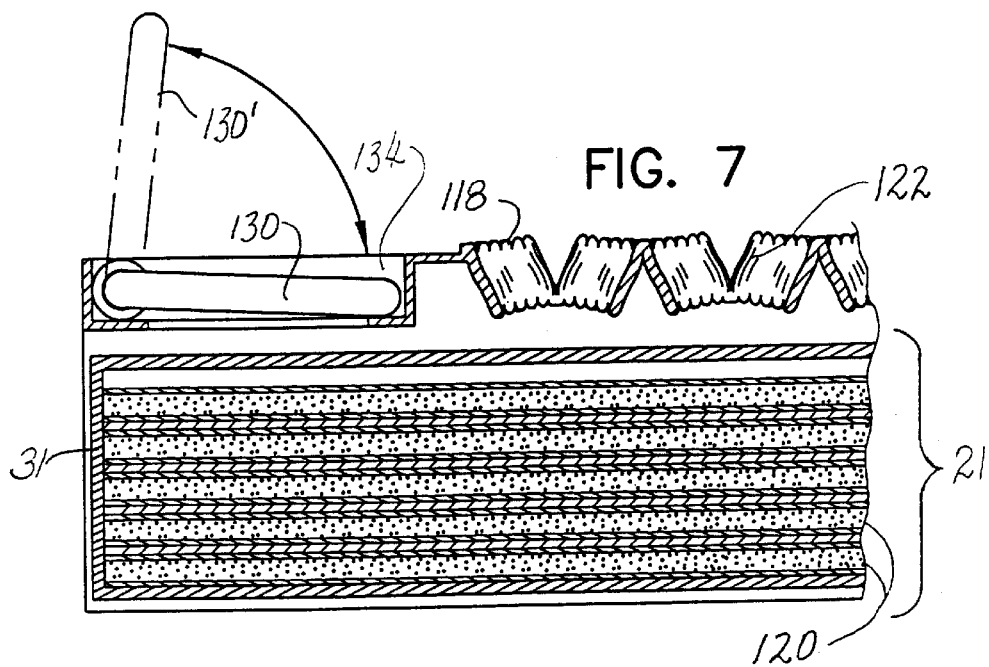
FIG. 7 is a partial sectional view, taken through line 7—7 of FIG. 6.
Figure 8:
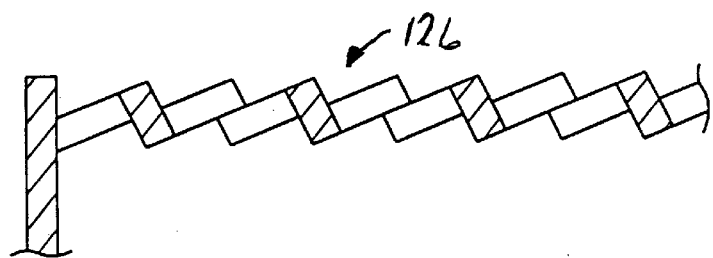
FIG. 8 is a partial cross-sectional view of an alternative embodiment for a floor grate filter.

Turning now to FIGS. 6, 7, and 8, the construction of our combination floor grate filters may be seen in more detail. The grate or frame portion 20 is formed in a generally U-shaped cross section with a deck surface 110, sides 112 and a turned back foot or flange section 114. Deck 110 has openings 116 which may be planar or have upraised teeth 118 for better foot traction. Filter portion 21 may be formed from a plurality of mesh elements 120. These may be wire screens of various types or they may be made from expanded metal which may have diamond or other shaped openings of graded sizes as will be shortly described. However, many other configurations of mesh elements are also suitable. The filter elements are preferably permanently enclosed in a peripheral frame 31.

The frame elements will be load bearing and should have a metal thickness and span suitable to carry a load of at least about 630 kg/m$^2$ (150 lb/ft$^2$). In our novel combination floor grate filters, the floor grate elements on the face 110 of the frame 20 may be formed in various dimensions, and with various surface configurations such as planar or with teeth 118, as is shown in FIG. 6. The openings 116 in the frame may be sized so as to constitute an initial media mesh layer $M_0$. Consequently, the overall filter media includes the initial media mesh layer, and all subsequent media mesh layers $M_1$ through $M_n$. One desirable configuration of grate design is shown in FIGS. 6 and 7, where expanded metal elements 122 are shown punched and formed in a stainless steel metal sheet. Grids of roughly diamond shaped grate openings (see FIG. 6) result. A "Grip-Strut" tread design such as is available from McNichols Co. of Tampa, Fla., would be typical of a serrated surface that provides relatively safe and sure footing insofar as is possible on inherently slippery paint containing surfaces, and which preferably complies with slip-resistance standards established by U.S. Occupational Safety and Health Administration Specifications. In such designs, when mild steel is utilized, a 10 gauge, mill galvanized before fabrication to ASTM A525, material is satisfactory. Alternately, if aluminum can be utilized, it is usually provided in thicknesses of 0.10" to 0.15". Most preferably, the opening and tooth design should meet the minimum skid resistance in OSHA tests made in longitudinal, transverse, and diagonal directions with boot sole materials of leather, boot rubber, shoe rubber, neolite, resist and where thicknesses actual grip transverse, and Hypalon. Alternate traction materials for the face 110 of outer frame section 20, such as a McNichols Co. "Grate-Lock" brand surface may be appropriate for certain locations. More broadly, any material and configuration which both is able to serve as a deck in paint booths 10 or 10' and as a container for a filter element 21 can be utilized for providing an outer frame section 20. The length and width of the filters will vary considerably but may typically be as large as 1.2 m (4 ft) square.

An alternate face configuration 126 utilizing an expanded metal mesh technique is illustrated in cross section in FIG. 8 and can be utilized to provide an tread deck. Also shown in the various figures, and particularly in FIG. 7, are optional pivoting handles 130 and 132. As can be seen in FIG. 7, which shows a partial cross section, taken along line 7—7 of FIG. 6, handle 130 is pivotally mounted to outer frame section 20, so that it may be repositioned to location 130', as necessary for handling. Handles 130 and 132 are preferably stowed during use of the paint booth in handle recesses 134 formed in the central area of the first and second ends of outer frame section 20.

Figure 9:
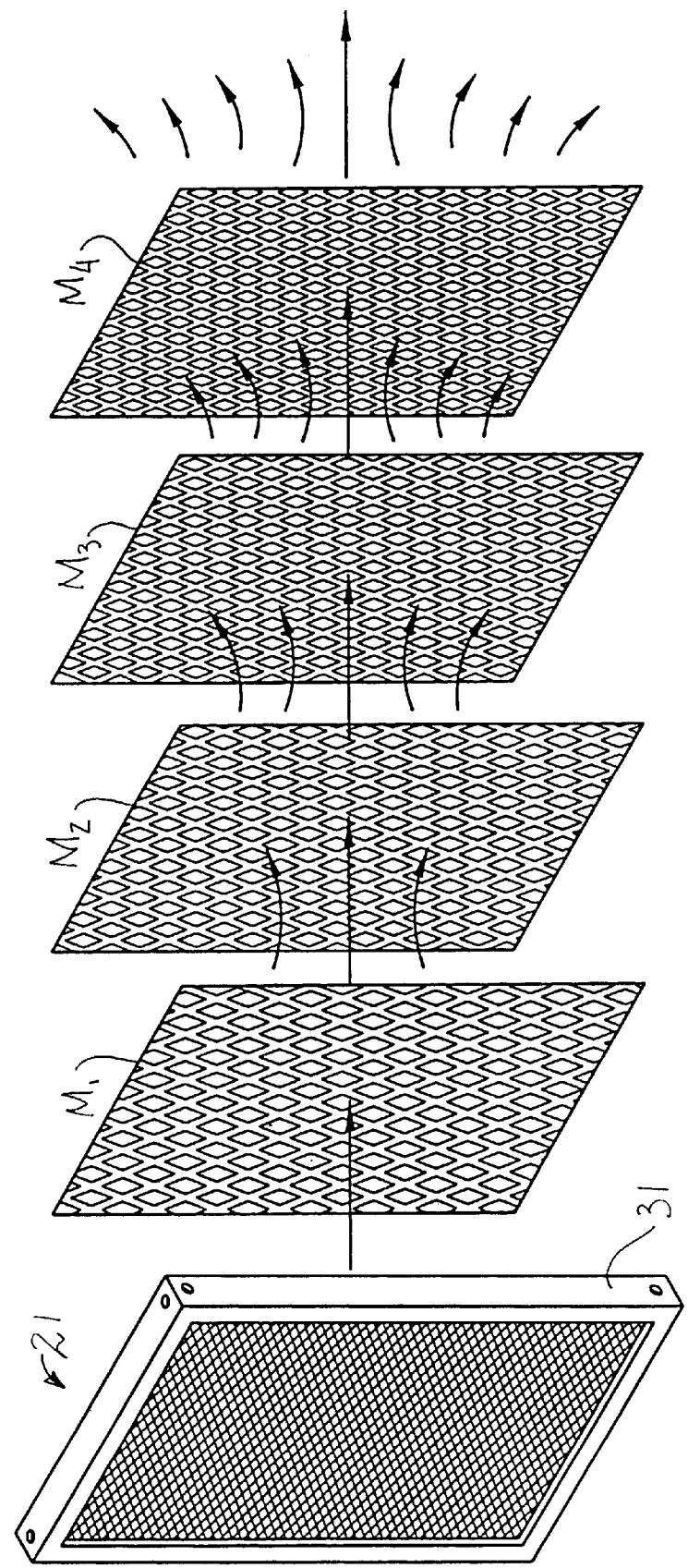
FIG. 9 is an exploded perspective view of one embodiment of one filter design.
Figure 10:
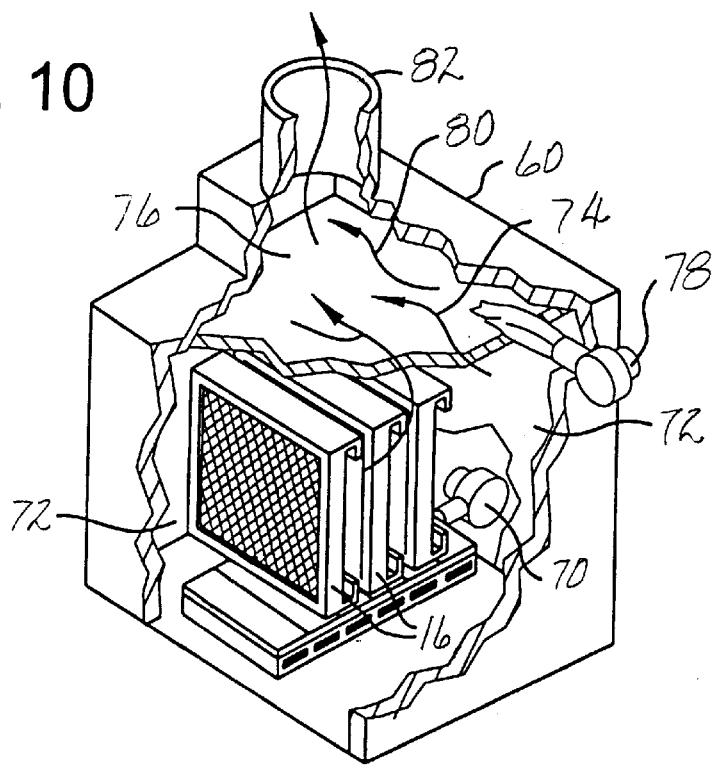
FIG. 10 is a diagram a burn off oven for removal of paint residue from the combination floor grate filters.

A preferred type of filter having high efficiency and low air resistance is shown in exploded view in FIG. 9. Filter 21 is comprised of at least two, and more preferably four or more mesh portions which may be identified as mesh portions $M_1$, $M_2$ ... to $M_n$. These mesh portions $M_1$ to $M_n$ are preferably each a layer of stainless steel corrugated or expanded metal. The mesh portions occur more preferably in at least four to six layers. Most preferably, for a frame of one or two inch total filter media thickness (see FIGS. 2 or 9), our design comprises eight or more mesh portions. Each of the mesh portions preferably has a different configuration, as is best seen in FIG. 9. The first layer may have one configuration, such as a diamond shaped opening of about 12×6 mm (0.5 in×0.25 in). The second layer may have a second configuration which might be the same as the first layer $M_1$, or might be slightly smaller. The middle layers, e.g. $M_3$, $M_4$, $M_5$, etc., could be of a pleated or corrugated design with openings in the 6×3 mm (0.25 in by 0.125 in) size. The final layer, $M_n$, may have openings of 3×1.6 mm (0.125 in×0.0625 in) in size or smaller. Most preferably the mesh elements are permanently retained in a frame 31. This design is a "progressive density" type paint collector. Successive layers are displaced from each other to form a torturous air passage in order to obtain maximum overspray removal. The first few mesh layers $M_1$, $M_2$ or so act as a pre-filter to the following layers $M_3$, $M_4$, etc. The progressive density design helps prevent face loading of the filters; i.e., avoids capture of most of the particulates on the first one or two layers and thereby avoids restricting the air flow so as to cause the later mesh layers to become ineffective. The ability of the filter to capture and to hold paint overspray particulate at low air velocities, such as face velocities of 90–120 m/min (300–400 fpm), until such time as the floor grate filter can be removed and cleaned, is of primary importance.

In the typical paint booth, filters and optional post filters are left in place until they are 'loaded' with a mass of paint that has been removed from the air stream to such a degree that (a) they can no longer function to an adequate removal efficiency, and/or (b) because the pressure drop ($\Delta P$) across the filter(s) becomes excessive, generally as indicated by a remote pressure differential gauge device. Alternately, and particularly with experienced operators, filters may be changed based on visual appearance at time of an inspection. In any case, a primary filter (here, the combination floor grate filter 16 or 18) is ultimately removed from the paint booth when it has completed a cycle of service, and replaced by clean filters.

When our combination floor grate filters are used in paint booth operations, upon removal from the paint booth the combination floor grate filters are preferably cleaned and then returned to service. Cleaning of the combination floor grate filters can be accomplished in any effective process, but we prefer cleaning by placing any of the selected combination floor grate filter designs in either (a) a "bake-off" or "heat cleaning" type oven or (b) in a solvent or other suitable chemical cleaning solution.

A typical example of a suitable "bake-off" oven would be the GO Series Heat Cleaning Ovens as manufactured by Guspro, Inc., Chatham, Ontario. The use of such an oven to reclaim metallic filters of the type similar to those shown in FIGS. 1–9 is described in our copending application, Ser. No. 08/872,484, filed Jun. 7, 1997, which is herein incorporated by reference. In the oven 60, one or more combination filter grates 16 or 18 are heated via primary burner 70, to oxidize contaminants (such as paint residue) in the process heating chamber 72. The exact temperatures selected for operation of heating chamber 72 in oven 60 will depend on a variety of factors, including the paint to be oxidized, the local emission regulations, and the oven design itself. Typically, an initial heating period at about 120° C. (about 250° F.) for about 1–2 hours is used. This completes drying of any wet paint present at a controlled rate so that there in not an initial rush of volatile organic products that might give rise to an explosive atmosphere. This is usually followed by at least one more stage at higher temperature. Most typically a second stage at about 175° C. (350° F.) for one hour will be followed by a third stage at about 290° C. (550° F.) for a similar time. The later heating stages complete pyrolysis of any organic materials and leave a clean ash. The gases 74 from the primary heating chamber are directed into a secondary chamber 76 where they are subjected to a high temperature provided by secondary burner 78. Temperature in this chamber is elevated as high as 870° C. (1600° F.) but more preferably is around 790° C. (1450° F.) to ensure total combustion of volatile organic materials. Flue gases 80 exiting chimney 82 are essentially free of gases that could be considered as atmospheric pollutants. Ideally, a residence time of at least 0.75 seconds at the desired final temperature is achieved in the oxidizing afterburner chamber 76 for gases traversing therethrough.

Upon removal of floor grate filters 16 or 18 from the oven 60, any convenient method, such use of pressurized air or other pneumatic, hydraulic, or mechanical methods, may be used to remove residual ash. The ash normally passes applicable regulatory criteria for disposal as a nonhazardous material. Typically, with U.S. EPA regulations, a non-detect analytical result for volatile organic compounds is required. Also, a toxicity characteristic leaching procedure test (TCLP) is performed, and the reported leachate contaminant levels must be below hazardous waste listing criteria levels.

To return the recycled combination floor grate filter 16 or 18 to service in paint booth 10, the floor grate filters are returned to their operating location in the deck 24 of paint booth 10. Also, new post filters 30, 44, or 46, are provided when needed. Most usually, new post filters will be needed only after five to ten cleaning cycles of the primary floor grate filters.

Depending upon the particular paint being used, it may be desirable to use a chemical cleaning method for the floor grate filters rather than by use of the thermal cleaning method just described. The floor grate filters may be removed from their operating location in a paint booth, and immersed in a chemical cleaning solution which is contained in cleaning vat, not shown. In such situations, a selected solvent compound is placed in the vat and the residual paint adhering to the floor grate filters is solvated into the liquid chemical cleaning solution. We prefer to use a high pH oil based cleaning and stripping compound, such as EuroStrip brand low volatile organic content (VOC) cleaning solution manufactured by Oakite, Inc. However, other cleaning solutions may be selected in view of the actual coating compound being applied in a given situation. It will be understood that the frame section and the mesh section must be capable of reliably withstanding the preselected solvent bath and any hydraulic or mechanical cleaning of paint therefrom while immersed in the bath. This is important since the cleaning cycle may be enhanced with mechanical agitation or other commonly available means, such as ultrasonic techniques. When a preferred integral floor grate filter 16 or 18 with endcaps 23 is removed from the paint booth and is placed into the cleaning vat, the media mesh remains permanently within. On the other hand, when a floor grate filter with removable filter 22 having peripheral frame 31 is utilized, the filter 22 may be separately removed and cleaned. The chemically cleaned combination floor grate filters are then dried and returned to service in an operating condition in the deck of a down flow paint booth.

Although metal mesh type filters have been used in other configurations and for other applications for some time, our combination floor grate filters have several novel and improved characteristics over the prior art metal mesh filters known to us. In particular, our combination floor grate filters 16 or 18 have both an outer frame section 20 and filter media mesh section 21 which is constructed of a material designed to repeatedly withstand extreme temperatures or chemical baths at levels as set forth above. For thermal cleaning applications, we prefer (a) a stainless steel outer frame section 20 with a stainless steel mesh section 21, or (b) a mild steel outer frame section 20 (also including grate) with a stainless steel mesh section 21. Alternately, when chemical cleaning is utilized, the outer frame section and the filter media mesh section 21 are selected for compatibility and long life with repeated cleaning cycles in a suitable chemical cleaning solution. Generally, chemical cleaning allows a wider choice of construction materials than when thermal cleaning is used, since a large variety of non-metallic materials may be utilized. One such substances is fiberglass reinforced plastic (FRP), although for present purposes we consider such terminology to more broadly include other composite materials, such as carbon fiber composite, metal matrix composite, or high strength plastic materials which may not be reinforced with glass fiber, or those materials made out of a variety of thermosetting or epoxy type materials. Therefore, the following options, among others, are available, depending upon the exact cleaning method utilized:

| Outer Frame Section | Filter Media |
| --- | --- |
| (a) Stainless steel | Stainless steel |
| (b) Steel | Stainless steel |
| (c) Steel | Steel |
| (d) Aluminum | Aluminum |
| (e) Steel | Aluminum |
| (f) Stainless steel | Aluminum |
| (g) FRP | FRP |

Floor grate filters intended for cleaning in a bake off oven must be capable of withstanding temperatures as high as 370° C. (700° F.). It is for this reason that stainless steel construction is preferred. Those intended for use with a chemical cleaning cycle do not have this severe requirement and mild steel, aluminum, or FRP are acceptable.

When using our combination floor grate filters with either cleaning technique, the quantity of both sludge and of spent paint filters is dramatically reduced. Thus, both the disposal and the overall operating costs of the paint booth are reduced. It is thus to be appreciated that the novel cleanable combination floor grate filter provided by the present invention, and the method by which cleaning and recycling of such filters is made possible, dramatically reduces requirements for disposal of hazardous waste. This is therefore a significant improvement in the state of the art of paint booth operation and maintenance. Our novel combination floor grate filter design, and the method of employing the same by recycling the combination paint booth filters during routine paint booth operations, is relatively simple, and it substantially reduces the cost of the paint booth operations.

Preferably, our combination floor grate filter 16 or 18 includes an integral filter mesh media portion 21 with end caps 23 and a plurality of metal mesh portions $M_1$ through $M_n$. When stainless steel is utilized, we prefer type 304 stainless, but various other types are amenable to repeated thermal cleaning cycles, or to chemical cleaning cycles. More preferably, stainless steel is used for both outer frame section 20 and filter mesh 21. Also, when peripherally framed filter sections 22 are utilized, the peripheral frame 31 is preferably of type 304 stainless steel. Alternately, non-metal composites or ceramic materials may be provided for either the outer frame section 20 or for filter mesh 21, so long as the material will withstand repeated handling and either the temperature cycling or repeated chemical cleaning as herein described.

Figure 11:
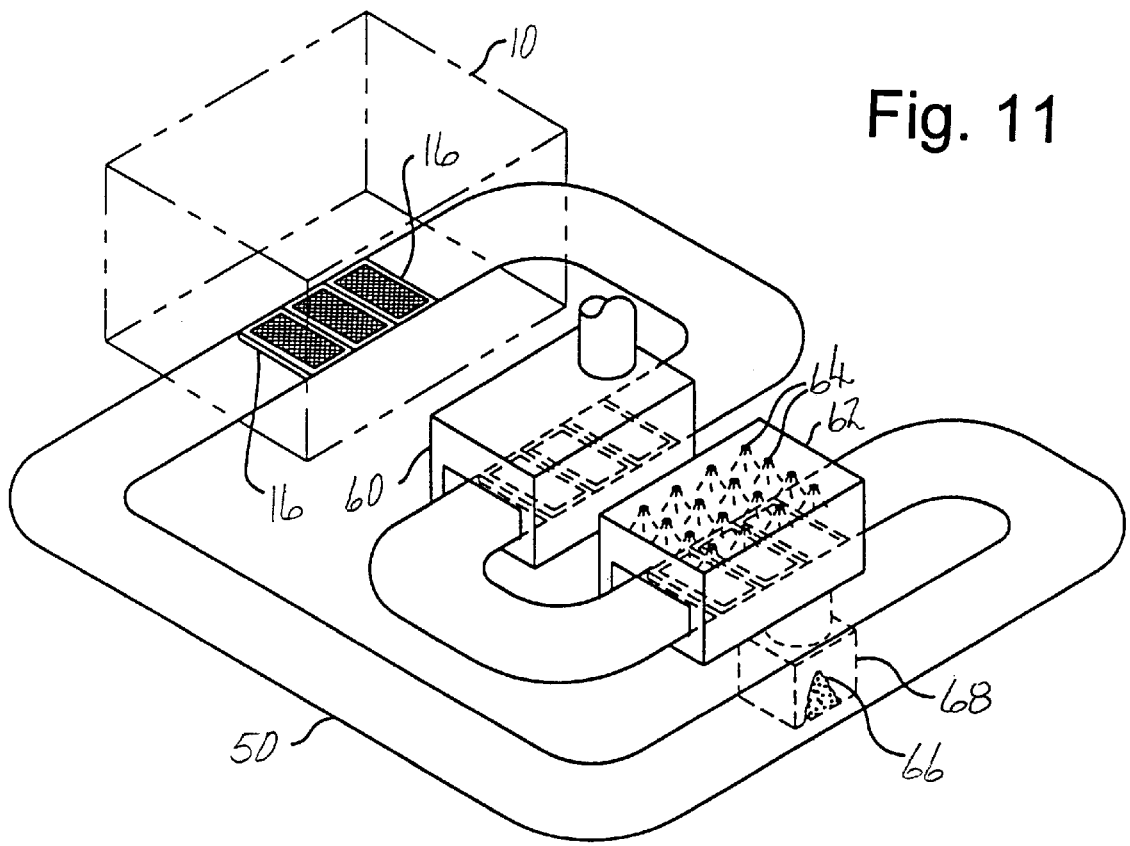
FIG. 11 is a diagrammatic depiction of an automated thermal cleaning system for moving the combination floor grate filters from and back to an operating position in a paint booth.

One advantage of our combination floor grate filters is their compatibility with an automated cleaning cycle. FIG. 11 illustrates such an operation. The floor grate filters 16 are removed from paint spray booth 10 and circulated on a track or other conveyor 50 into the bake off oven 60 or a chemical cleaning vat, not shown. When the bake off oven is used, the grates with any residual ash are conveyed to a pneumatic or hydraulic treatment chamber 62 where they are hit with air or water jets 64. Removed moved ash 66 is collected in ash hopper 68. The cleaned floor grate filters are then transferred along conveyor 50 where they may be reinstalled in spray booth 10.

When using our combination floor grate filters with either cleaning technique, the quantity of both sludge and spent paint filters is dramatically reduced. Thus, both the disposal and the overall operating costs of the paint booth are reduced. It is thus to be appreciated that the novel cleanable combination floor grate filter provided by the present invention, and the method by which clearing and recycling of such filters is made possible, dramatically reduces requirements for disposal of hazardous waste. This is a significant improvement in the state of the art of paint booth operation and maintenance.

EXAMPLE

A wet type industrial downdraft paint booth facility used to paint commercial truck bodies is initially equipped with a water scrubbing system. Our novel combination floor grate filters are installed in place of the conventional floor grates. These are 155×110 mm (36 in long by 24 in wide) and have 16 diamond pattern mesh layers contained integrally within the floor grate to provide a progressive-type filter. The mesh openings from largest to smallest are equivalent in size to those described earlier. Airflow is maintained normally for the operation of the booth. However, the sludge quantity generated for disposal in the recirculating water bath is approximately 98% less than before installation of our combination floor grate filters. Our novel combination floor grate filters are able to maintain airflow in excess of 200 feet per minute after five days of two shifts per day operations. At that time, our metal filters are removed, and upon weighing the filters, it is determined that our filters have captured a large quantity of paint overspray. The paint is removed from the filters by heating in a bake-off oven, and the combination floor grate filters are returned to service.

It will be readily apparent to the reader that our novel, recyclable combination floor grate filters, and the method of using the same in paint booth filtration systems, may be easily adapted to other embodiments incorporating the concepts taught herein. Thus, the invention may be embodied in other specific forms without departing from the spirit or essential characteristics thereof. Therefore, the embodiments presented herein are to be considered in all respects as illustrative and not restrictive. All variations of the devices which are described herein, or which fall within the meaning and range of equivalents of the disclosures and claims set forth herein, are therefore intended to be embraced by the claims set forth below.

We claim:

1. A floor grate filter for a downdraft paint spray booth which comprises in combination:

an outer load bearing, rectangular metal frame, generally U-shaped in cross section, and able to withstand an applied load of at least 630 kg/m$^2$ (150 lb/ft$^2$); and a recyclable filter element contained within the frame.

2. The filter of claim 1 in which the filter element is removable from the frame.

3. The filter of claim 1 in which the filter element is integral with the frame.

4. The filter of claim 3 in which the frame has end caps to retain the filter element.

5. The filter of claim 1 in which the filter element is metallic.

6. The filter of claim 5 in which the frame and filter element are of a material capable of withstanding a temperature of at least 370° C. (700° F.) to bake off any paint overspray particles accumulated during use.

7. The filter of claim 1 in which the frame and filter element are of a material capable of withstanding a chemical treatment to remove any paint overspray particles accumulated during use.

8. The filter of claim 1 in which the frame has pivotally mounted handles for easy insertion and removal.

9. The filter of claim 1 in which the filter element is a metallic mesh.

10. The filter of claim 1 in which the filter element is a plurality of diamond grid expanded metal sheets, the sheets having progressively smaller openings from entry to exit surfaces of the filter.

11. The filter of claim 10 in which the filter elements are enclosed within a peripheral frame.

12. A downdraft paint spray booth comprising:

an enclosure having a floor portion comprised of a plurality of load bearing, readily removable floor grate filters and supporting members for the filters, said filters further comprising:

an outer load bearing, rectangular metal frame generally U-shaped in cross section; and a recyclable filter element contained within the frame.

13. The spray booth of claim 12 in which the supporting members are flanges and the floor grate filters rest on the flanges.

14. The spray booth of claim 12 in which the floor grate filters are placed in an end-to-end and a side-by-side arrangement.

15. The spray booth of claim 12 in which the filter element is recyclable.

16. The spray booth of claim 15 in which the filter elements are metallic.

17. The spray booth of claim 12 in which the frame and filter element are of a material capable of withstanding a temperature of at least 370° C. (700° F.) to bake off any paint overspray particles accumulated during use.

18. The spray booth of claim 12 in which the frame and filter element are of a material capable of withstanding a solvent treatment to remove any paint overspray particles accumulated during use.

19. The spray booth of claim 12 in which the frame is formed from expanded metal having generally diamond-shaped openings and able to withstand an applied load of at least 630 kg/m$^2$ (150 lb/ft$^2$).

20. The spray booth of claim 12 in which the filter element is removable from the frame.

21. The spray booth of claim 12 in which the filter element is integral with the frame.

22. The spray booth of claim 12 in which the filter elements are enclosed within a peripheral frame.

* * * * *